United States Patent
Khandekar et al.

(10) Patent No.: US 10,015,789 B2
(45) Date of Patent: *Jul. 3, 2018

(54) ASYNCHRONOUS TIME DIVISION DUPLEX OPERATION IN A WIRELESS NETWORK

(71) Applicant: QUALCOMM Incorporated, San Diego, CA (US)

(72) Inventors: Aamod D. Khandekar, San Diego, CA (US); Ravi Palanki, Cupertino, CA (US); Peter Gaal, San Diego, CA (US); Tingfang Ji, San Diego, CA (US); Naga Bhushan, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/835,083

(22) Filed: Aug. 25, 2015

(65) Prior Publication Data

US 2015/0382346 A1 Dec. 31, 2015

Related U.S. Application Data

(63) Continuation of application No. 12/841,292, filed on Jul. 22, 2010, now Pat. No. 9,118,468.
(Continued)

(51) Int. Cl.
*H04W 72/04* (2009.01)
*H04L 1/00* (2006.01)
(Continued)

(52) U.S. Cl.
CPC ....... *H04W 72/0446* (2013.01); *H04L 1/0001* (2013.01); *H04L 5/1469* (2013.01);
(Continued)

(58) Field of Classification Search
CPC .......... H04W 72/0446; H04W 72/082; H04W 72/0413; H04W 72/042; H04L 5/16;
(Continued)

(56) References Cited

U.S. PATENT DOCUMENTS 5,689,502 A 11/1997 Scott
5,915,214 A * 6/1999 Reece ................... H04M 15/49
379/114.01
(Continued)

FOREIGN PATENT DOCUMENTS

EP 1655872 A1 5/2006
JP 2003526955 A 9/2003
(Continued)

OTHER PUBLICATIONS

International Search Report and Written Opinion—PCT/US2010/043157, International Search Authority—European Patent Office—dated Nov. 4, 2010.
(Continued)

*Primary Examiner* — Christine Ng
(74) *Attorney, Agent, or Firm* — Holland & Hart LLP/Qualcomm (57) ABSTRACT

Techniques for supporting communication in an asynchronous TDD wireless network are described. In an aspect, downlink transmissions and uplink transmissions may be sent on different carriers in an asynchronous TDD wireless network to mitigate interference. In one design, a station (e.g., a base station or a UE) may send a first transmission on a first carrier in a first time period and may receive a second transmission on a second carrier in a second time period. The station may only transmit, or only receive, or neither in each time period. In one design, allocation of carriers for the downlink and uplink may be performed when strong interference is detected, e.g., by a base station or a
(Continued)

UE. When strong interference is not detected, the first and second carriers may each be used for both the downlink and uplink.

24 Claims, 8 Drawing Sheets

Related U.S. Application Data (60) Provisional application No. 61/227,913, filed on Jul. 23, 2009.

(51) Int. Cl.
| | | |
|---|---|---|
| *H04L 5/14* | (2006.01) | |
| *H04L 5/16* | (2006.01) | |
| *H04W 72/08* | (2009.01) | |
| *H04L 5/00* | (2006.01) | |

(52) U.S. Cl.
CPC ............ *H04L 5/16* (2013.01); *H04W 72/042* (2013.01); *H04W 72/0413* (2013.01); *H04W 72/082* (2013.01); *H04L 1/0026* (2013.01); *H04L 1/0027* (2013.01); *H04L 5/0007* (2013.01)

(58) Field of Classification Search
CPC ... H04L 1/0001; H04L 5/1469; H04L 1/0026; H04L 1/0027; H04L 5/0007
USPC ....... 370/280, 328, 329, 336, 338, 343, 345, 370/465
See application file for complete search history.

(56) References Cited

U.S. PATENT DOCUMENTS

| | | | |
|---|---|---|---|
| 5,933,421 A | 8/1999 | Alamouti et al. | |
| 6,038,221 A | 3/2000 | Wickman et al. | |
| 6,101,176 A | 8/2000 | Honkasalo et al. | |
| H2106 H * | 7/2004 | Bilgic | 370/281 |
| 6,859,655 B2 | 2/2005 | Struhsaker | |
| 6,947,768 B2 | 9/2005 | Adachi et al. | |
| 7,969,923 B2 | 6/2011 | Sorond et al. | |
| 7,983,298 B2 | 7/2011 | Nanda et al. | |
| 8,045,512 B2 | 10/2011 | Khandekar et al. | |
| 8,144,658 B2 | 3/2012 | Damnjanovic et al. | |
| 8,305,943 B2 | 11/2012 | Khandekar et al. | |
| 8,350,717 B2 * | 1/2013 | Brennan, Jr. | G01D 4/004 340/870.02 |
| 9,118,468 B2 * | 8/2015 | Khandekar | H04L 5/16 |
| 2004/0076224 A1 * | 4/2004 | Onggosanusi | H04B 7/0634 375/144 |
| 2006/0126546 A1 | 6/2006 | Lee et al. | |
| 2007/0019771 A1 * | 1/2007 | Ambuehl | H04B 7/265 375/372 |
| 2008/0192622 A1 * | 8/2008 | Scheim | H04L 1/0025 370/210 |
| 2009/0262661 A1 * | 10/2009 | Ueda | H04N 1/00291 370/254 |
| 2009/0318181 A1 * | 12/2009 | Tao | H04W 52/143 455/522 |
| 2010/0142417 A1 | 6/2010 | Kim et al. | |
| 2011/0065390 A1 * | 3/2011 | Asplund | H01Q 1/246 455/63.1 |
| 2011/0176435 A1 | 7/2011 | Khandekar et al. | |

FOREIGN PATENT DOCUMENTS

| | | |
|---|---|---|
| JP | 2007137191 A | 6/2007 |
| WO | WO-9926437 A1 | 5/1999 |
| WO | WO-2006045097 A2 | 4/2006 |
| WO | WO-2006086788 A1 | 8/2006 |
| WO | WO-2007051194 A2 | 5/2007 |
| WO | WO-2007137191 A2 | 11/2007 |

OTHER PUBLICATIONS

Taiwan Search Report—TW099124375—TIPO—dated May 30, 2013.

* cited by examiner

ASYNCHRONOUS TIME DIVISION DUPLEX OPERATION IN A WIRELESS NETWORK

The present application is a continuation application of U.S. application Ser. No. 12/841,292, filed Jul. 22, 2010, assigned U.S. Pat. No. 9,118,468 with an issue date of Aug. 25, 2015, which claims priority to provisional U.S. application Ser. No. 61/227,913, entitled "Methods and Apparatus for Asynchronous Time Division Duplex Operation," filed Jul. 23, 2009, both assigned to the assignee hereof and incorporated herein by reference.

I. FIELD

The present disclosure relates generally to communication, and more specifically to techniques for wireless communication.

II. BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The wireless network may support asynchronous operation on the downlink and uplink. It may be desirable to support data transmission with asynchronous operation such that interference can be mitigated and good performance can be achieved.

SUMMARY

Techniques for supporting communication and mitigating interference in an asynchronous wireless network utilizing time division duplexing (TDD) are described herein. A TDD wireless network may typically operate synchronously and may use the same downlink-uplink partitioning for all base stations. This may ensure that downlink transmissions from different base stations and uplink transmissions from different UEs are time aligned. Interference due to these downlink and uplink transmissions may then be mitigated through various well-known mechanisms. However, synchronous operation and/or common downlink-uplink partitioning across base stations may not be attained in certain operating scenarios.

In an aspect, communication may be supported and interference may be mitigated in an asynchronous TDD wireless network by sending downlink transmissions and uplink transmissions on different carriers. Each carrier may correspond to a different frequency range. Interference from downlink transmissions on uplink transmissions, and vice versa, may be mitigated by sending the downlink transmissions and the uplink transmissions on different carriers.

In one design, a station (e.g., a base station or a UE) may support TDD operation and may only transmit, or only receive, or neither in each time period, e.g., each subframe. The station may send a first transmission on a first carrier in a first time period and may receive a second transmission on a second carrier in a second time period. In one design, the station may be a base station that may send a downlink transmission on the first carrier in the first time period and may receive an uplink transmission on the second carrier in the second time period. In another design, the station may be a UE that may send an uplink transmission on the first carrier in the first time period and may receive a downlink transmission on the second carrier in the second time period.

In one design, allocation of carriers for the downlink and uplink may be performed when strong interference is detected, e.g., by a base station and/or a UE. When strong interference is detected, the first carrier may be used for one link (e.g., the downlink or uplink), and the second carrier may be used for the other link (e.g., the uplink or downlink). When strong interference is not detected, the first and second carriers may each be used for both the downlink and uplink.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
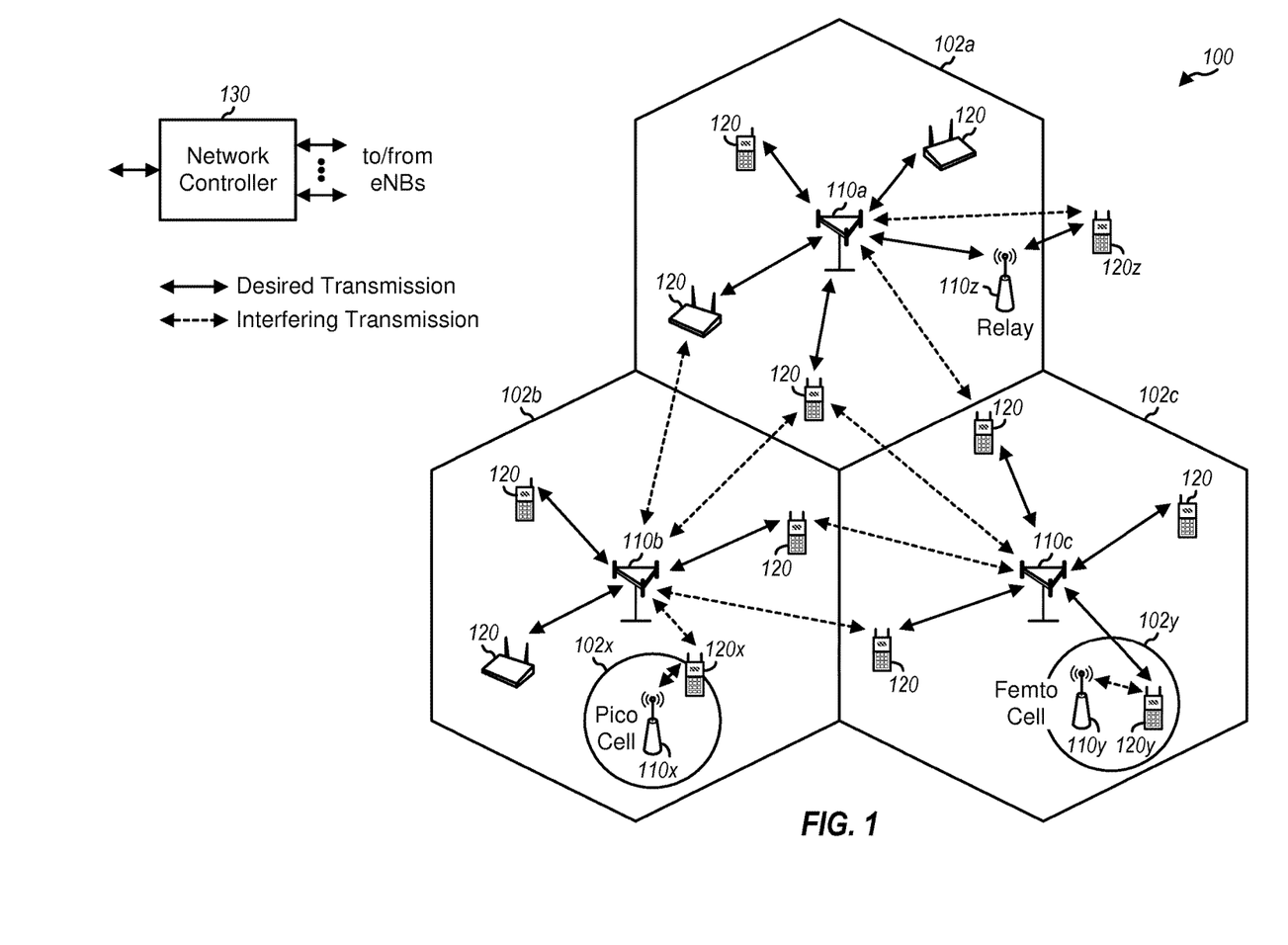
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

An eNB may provide communication coverage for a macro cell, a pico cell, a femto cell, and/or other types of cell. In the example shown in FIG. 1, eNBs 110a, 110b and 110c may be macro eNBs for macro cells 102a, 102b and 102c, respectively. eNB 110x may be a pico eNB for a pico cell 102x. eNB 110y may be a home eNB (HeNB) for a femto cell 102y. The terms "eNB" and "base station" may be used interchangeably herein.

Wireless network 100 may also include relay stations. A relay station may be an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110z may communicate with macro eNB 110a and a UE 120z in order to facilitate communication between eNB 110a and UE 120z. A relay station may also be referred to as a relay eNB, a relay base station, a relay, etc.

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Wireless network 100 may utilize time division duplexing (TDD) or frequency division duplexing (FDD). For TDD, the downlink and uplink may share the same frequency channel, and downlink and uplink transmissions may be sent on the same frequency channel in different time periods. For FDD, the downlink and uplink may be allocated separate frequency channels, which may be spaced apart by a sufficiently large distance (e.g., more than the system bandwidth) in frequency. Downlink transmissions and uplink transmissions may be sent concurrently on the two frequency channels.

Figure 2:
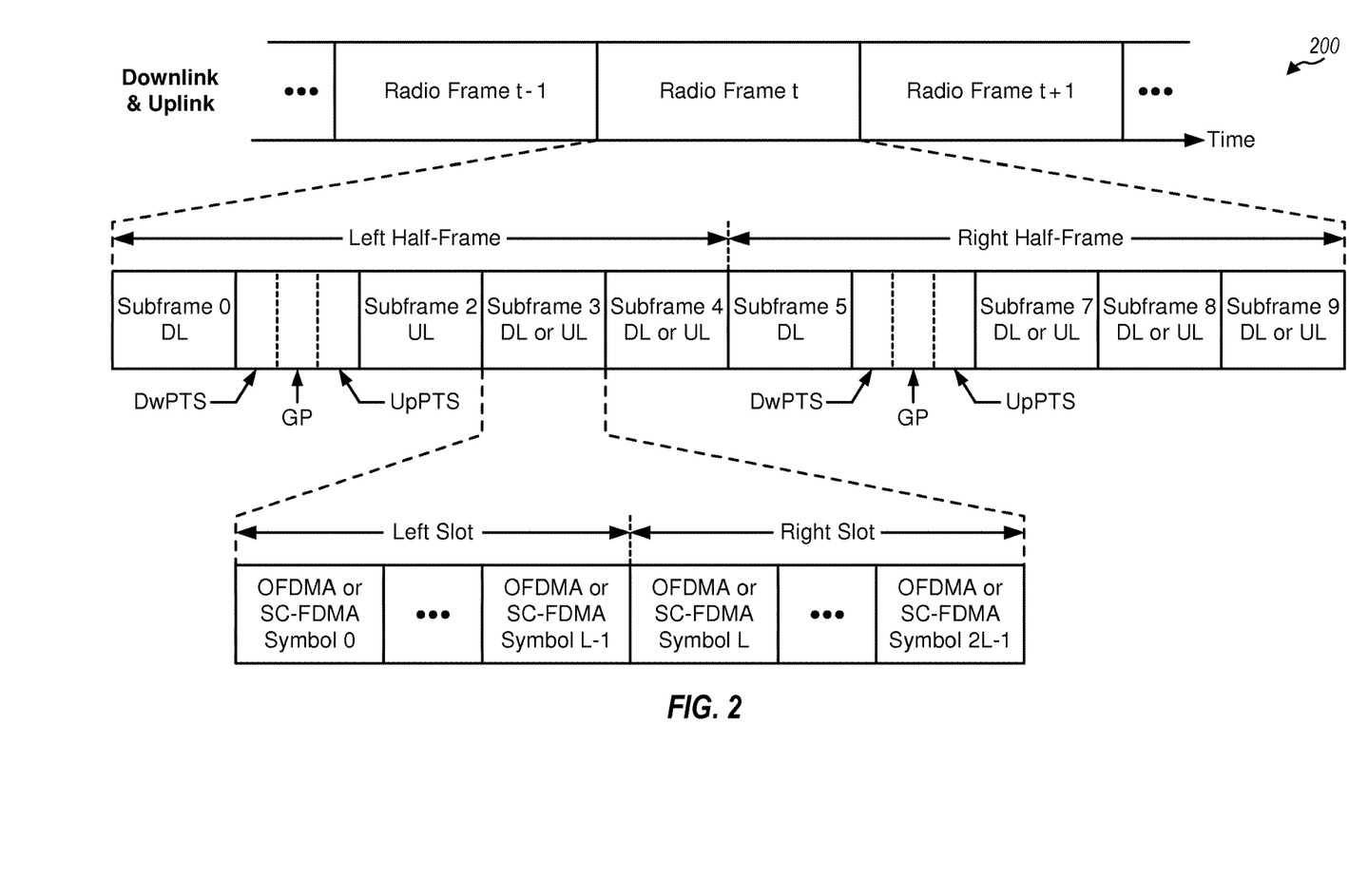
FIG. 2 shows an exemplary TDD frame structure.

FIG. 2 shows an exemplary TDD frame structure 200 used in LTE. The transmission timeline may be partitioned into units of radio frames. Each radio frame may have a predetermined duration (e.g., 10 milliseconds (ms)), and may be partitioned into two half-frames. Each radio frame may also be partitioned into 10 subframes with indices of 0 through 9. Each subframe usable for data transmission may be partitioned into two slots and may include 2L symbol periods. Each slot may include L=6 symbol periods for an extended cyclic prefix or L=7 symbol periods for a normal cyclic prefix. One OFDMA symbol may be transmitted in each symbol period on the downlink, and one SC-FDMA symbol may be transmitted in each symbol period on the uplink.

A number of downlink-uplink configurations are supported by LTE for TDD. Each downlink-uplink configuration indicates whether each subframe is a downlink (DL) subframe used for the downlink, or an uplink (UL) subframe used for the uplink, or a special subframe. Subframes 0 and 5 are used for the downlink and subframe 2 is used for the uplink for all downlink-uplink configurations. Subframes 3, 4, 7, 8 and 9 may each be used for either the downlink or uplink depending on the downlink-uplink configuration. Subframe 1 is a special subframe with three special fields for a downlink pilot time slot (DwPTS), a guard period (GP), and an uplink pilot time slot (UpPTS). Subframe 6 may be (i) a special subframe with only the DwPTS or all three special fields or (ii) a downlink subframe, depending on the downlink-uplink configuration. The DwPTS, GP, and DwPTS fields may have different durations for different special subframe configurations.

A wireless network typically operates synchronously when utilizing TDD. For synchronous operation, all eNBs in the wireless network may have their timing aligned to a reference time, e.g., GPS time. Furthermore, the eNBs may have the same downlink-uplink partitioning, so that different eNBs can (i) send downlink transmission to their UEs in the same time periods and (ii) receive uplink transmissions from their UEs in the same time periods. If synchronization and common downlink-uplink partitioning are not maintained across eNBs, then eNB-to-eNB interference and/or UE-to-UE interference may be observed.

Figure 3:
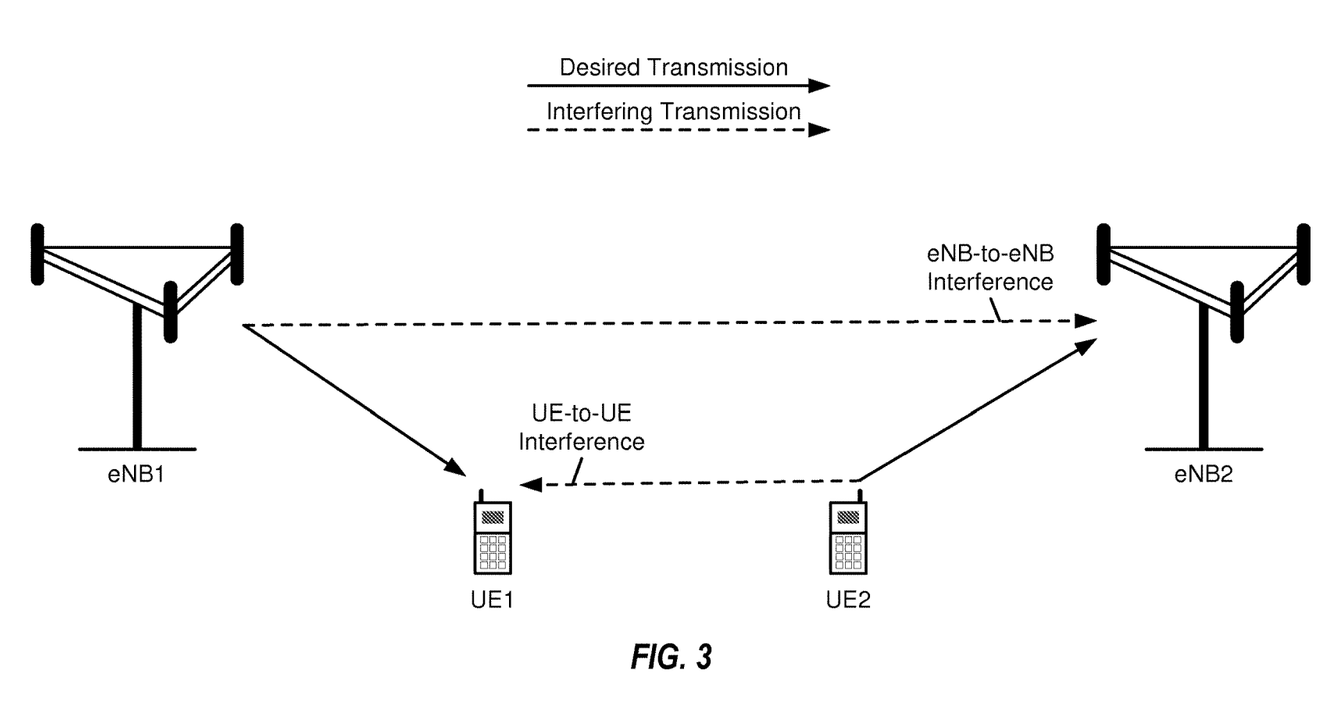
FIG. 3 shows a scenario with two eNBs communicating with two UEs.

FIG. 3 shows eNB-to-eNB interference and UE-to-UE interference in a scenario with two eNBs 1 and 2 communicating with two UEs 1 and 2, respectively. In the example shown in FIG. 3, eNBs 1 and 2 are not synchronous and have different timing. eNB 1 transmits data on the downlink to UE 1, and the downlink transmission from eNB 1 may be considered as an interfering transmission to eNB 2. eNB 2 may then observe eNB-to-eNB interference from eNB 1. Similarly, UE 2 transmits data on the uplink to eNB 2, and the uplink transmission from UE 2 may be considered as an interfering transmission to UE 1. UE 1 may then observe UE-to-UE interference from UE 2.

Figure 4:
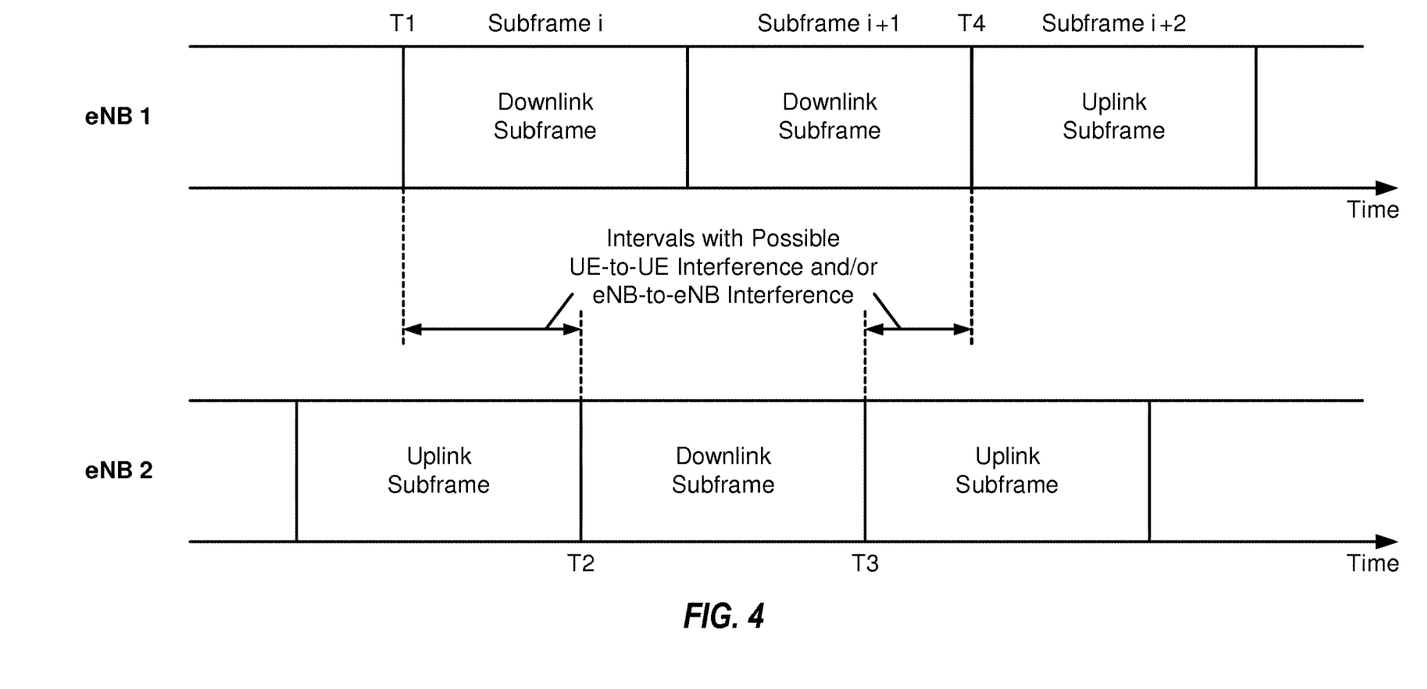
FIG. 4 shows exemplary downlink-uplink partitionings for two eNBs.

FIG. 4 shows exemplary downlink-uplink partitionings for eNBs 1 and 2 in FIG. 3 with asynchronous operation. As shown in FIG. 4, the start of the subframes for eNB 1 is not time aligned with the start of the subframes for eNB 2 due to asynchronous operation. Furthermore, the downlink-uplink partitioning for eNB 1 is different from the downlink-uplink partitioning for eNB 2.

The asynchronous timing and different downlink-uplink partitionings for eNBs 1 and 2 may result in eNB-to-eNB interference and UE-to-UE interference, as illustrated in FIG. 3. During the time interval from time T1 to time T2 and/or the time interval from time T3 to time T4, eNB 1 may transmit data on the downlink to UE 1, and UE 2 may transmit data on the uplink to eNB 2 on the same frequency channel. eNB 2 may observe interference from eNB 1 and may have difficulty receiving the uplink transmission from UE 2 due to the eNB-to-eNB interference. Furthermore, UE 1 may observe interference from UE 2 and may have difficulty receiving the downlink transmission from its eNB 1 due to the UE-to-UE interference.

As shown in FIGS. 3 and 4, eNB-to-eNB interference may occur when the downlink transmission from eNB 1 interferes with reception of the uplink transmission from UE 2 at eNB 2. eNB-to-eNB interference may be problematic due to one or more of the following reasons:

1. Interfering eNB 1 may have a much higher maximum transmit power than that of desired UE 2,
2. The transmit power of interfering eNB 1 may not be power controlled to ensure that the received power falls within a predefined range at eNB 2 (whereas the transmit power of UEs may be power controlled), and
3. In an inter-frequency scenario, eNBs 1 and 2 may be very close to each other (and may even be co-located), in which case the received power of interfering eNB 1 will be much higher than the received power of UE 2 at eNB 2.

Similarly, UE-to-UE interference may occur when the uplink transmission from UE 2 interferes with reception of the downlink transmission from eNB 1 at UE 1. UE-to-UE interference may be problematic because of the following reason:

1. Interfering UE 2 may be much closer to victim UE 1 (e.g., UEs 1 and 2 may be in the same room) as compared to eNB 1, which UE 1 is trying to receive.

As discussed above, synchronization and coordination of downlink-uplink partitioning across eNBs may be used to avoid eNB-to-eNB interference and UE-to-UE interference in a wireless network utilizing TDD, e.g., an LTE TDD network, a WCDMA TDD network supporting High Speed Packet Access (HSPA), a TD-SCDMA network, etc. However, achieving synchronization may be impractical or expensive in many cases. As an example, for indoor femto cells or home eNBs, it may be difficult to achieve synchronization between all home eNBs and macro eNBs. A home eNB may be installed anywhere and may operate asynchronously with respect to the macro eNBs. As another example, different network operators may share the same frequency spectrum for TDD. It may be challenging for base stations (e.g., home eNBs) belonging to different neighbors to have a common timing reference and/or a common downlink-uplink partitioning.

In an aspect, eNB-to-eNB interference and/or UE-to-UE interference in an asynchronous wireless network utilizing TDD may be mitigated by sending downlink transmissions and uplink transmissions in different frequency ranges. Interference from the downlink transmissions on the uplink transmissions, and vice versa, may then be mitigated.

In one design, multiple carriers may be available. Each carrier may correspond to a range of frequencies. The multiple carriers may have the same bandwidth or different bandwidths. At least one carrier may be allocated for the downlink, and each such carrier may be referred to as a downlink carrier. At least one other carrier may be allocated for the uplink, and each such carrier may be referred to as an uplink carrier. eNBs may send downlink transmissions on the downlink carrier(s), and UEs may send uplink transmissions on the uplink carrier(s). The receivers of the eNBs and/or the UEs may perform filtering between adjacent carriers. As a result, the likelihood of severe eNB-to-eNB interference and/or severe UE-to-UE interference may be reduced. If more than two carriers are available, then it may be beneficial to select the downlink carrier(s) to be as far away as possible from the uplink carrier(s).

Figure 5:
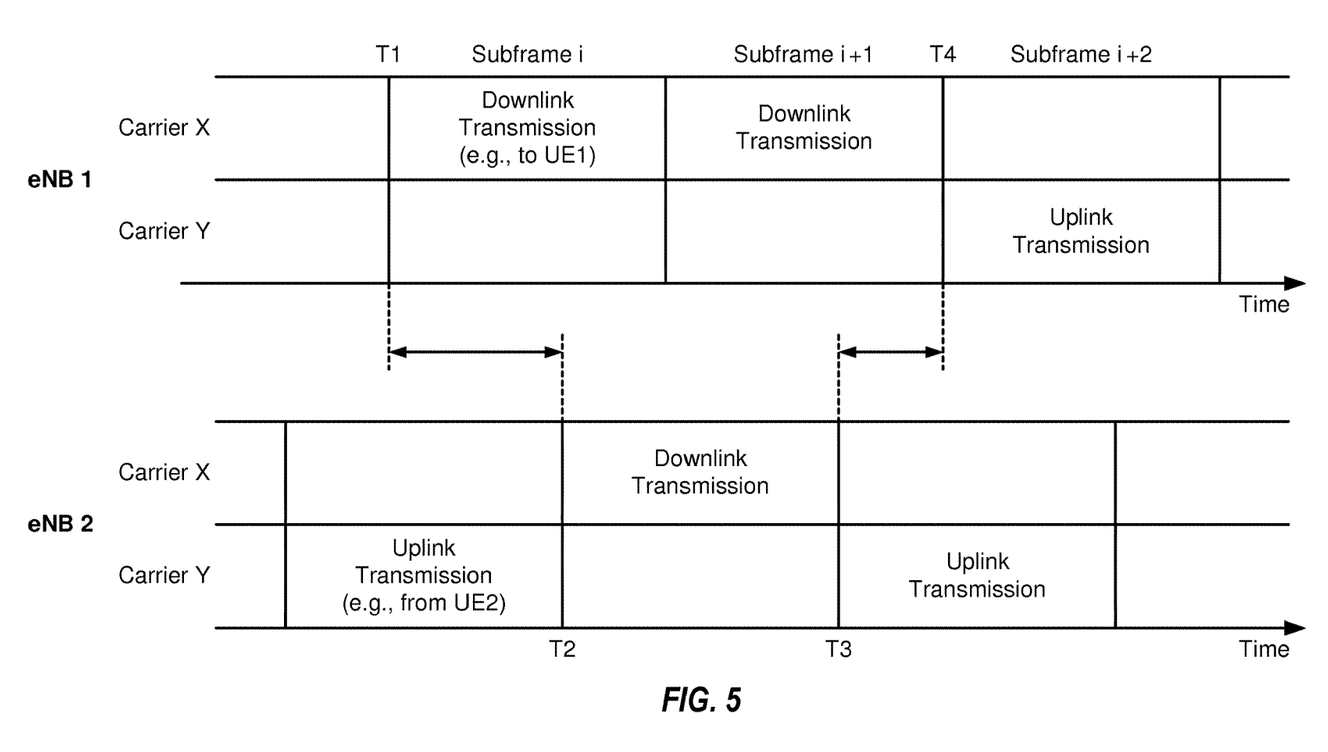
FIG. 5 shows mitigation of interference for TDD operation on two carriers.

FIG. 5 shows an example of mitigating eNB-to-eNB interference and/or UE-to-UE interference in a scenario with two eNBs 1 and 2 and two carriers X and Y. In the example shown in FIG. 5, carrier X may be allocated for the downlink, and carrier Y may be allocated for the uplink. eNB 1 uses the downlink-uplink partitioning for eNB 1 shown in FIG. 4, and eNB 2 uses the downlink-uplink partitioning for eNB 2 shown in FIG. 4. However, downlink transmissions are sent on only carrier X, and uplink transmissions are sent on only carrier Y. Each eNB may use only half of the system bandwidth.

During the time interval from time T1 to time T2 and/or the time interval from time T3 to time T4, eNB 1 may transmit data on the downlink to UE 1 on carrier X, and UE 2 may transmit data on the uplink to eNB 2 on carrier Y. eNB 2 may receive the desired uplink transmission from UE 2 on carrier Y and may observe interference from eNB 1 on carrier X. eNB 2 may sufficiently filter the interference from eNB 1 and may be able to successfully decode the uplink transmission from UE 2. eNB-to-eNB interference may thus be mitigated by sending downlink and uplink transmissions on different carriers.

Furthermore, during the time interval from time T1 to time T2 and/or the time interval from time T3 to time T4, UE 1 may receive the desired downlink transmission from eNB 1 on carrier X and may observe interference from UE 2 on carrier Y. UE 1 may sufficiently filter the interference from UE 2 and may be able to successfully decode the downlink transmission from eNB 1. UE-to-UE interference may thus be mitigated by sending downlink and uplink transmissions on different carriers.

FIG. 5 shows an example in which two carriers are available for use. In general, any number of carriers may be available. Each carrier may be allocated for the downlink, or the uplink, or both the downlink and uplink. The downlink carrier(s) may be selected to be as far away in frequency from the uplink carrier(s) as possible in order to mitigate interference.

Figure 6:
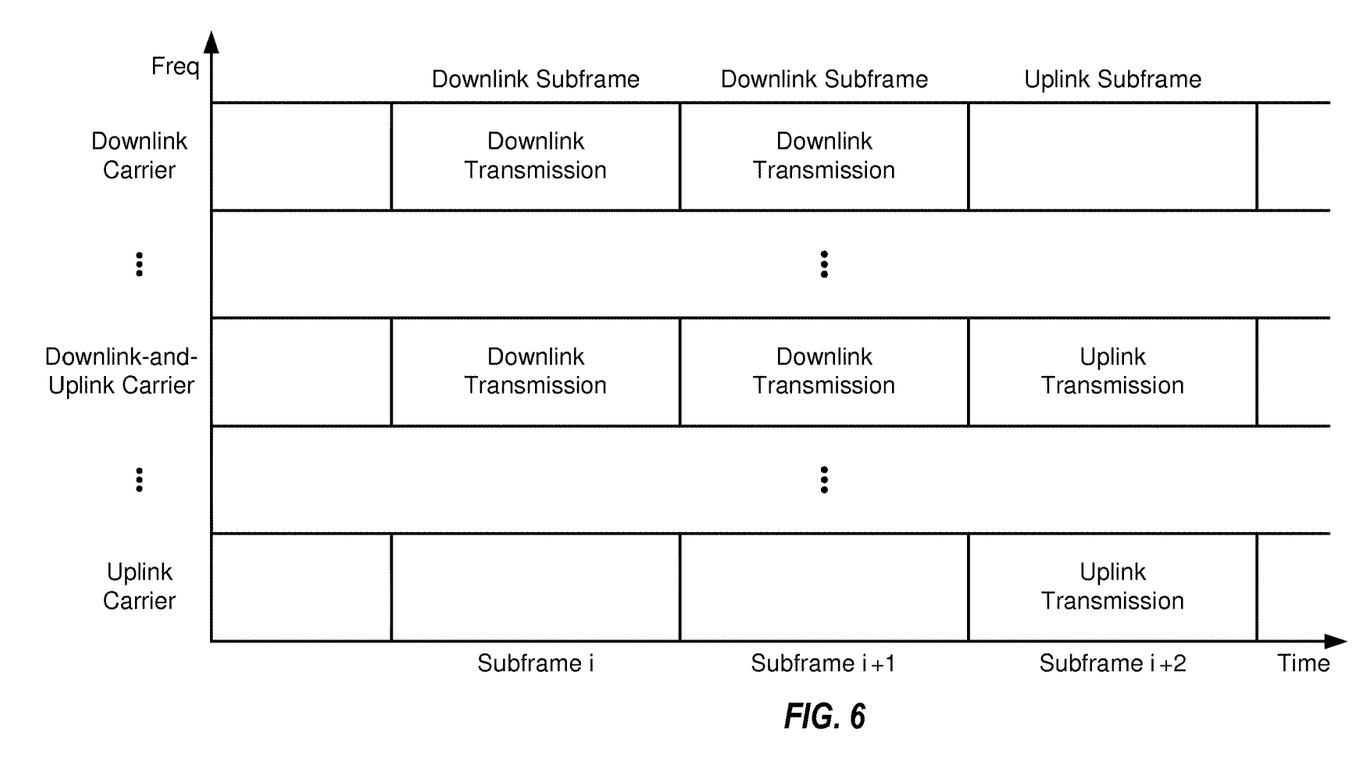
FIG. 6 shows allocation of multiple carriers for the downlink and uplink for TDD operation.

FIG. 6 shows a design of allocating carriers for the downlink and uplink to mitigate eNB-to-eNB interference and/or UE-to-UE interference. In this design, one or more carriers at one end of a spectrum band may be allocated for the downlink. One or more other carriers at the other end of the spectrum band may be allocated for the uplink. One or more remaining carriers near the middle of the spectrum band may be allocated for both the downlink and uplink, and each such carrier may be referred to as a downlink/uplink carrier. The number of downlink carriers may or may not match the number of uplink carriers.

As shown in FIG. 6, in each downlink subframe, downlink transmissions may be sent on the downlink carriers as well as the downlink/uplink carriers. In each uplink subframe, uplink transmissions may be sent on the uplink carriers as well as the downlink/uplink carriers. A downlink carrier may thus be used in only downlink subframes, and an uplink carrier may be used in only uplink subframes. However, a downlink/uplink carrier may be used in both downlink and uplink subframes.

An eNB may allocate carriers for the downlink and uplink in various manners. In one design, the allocation may be explicitly performed by the eNB, and the allocated carriers may be explicitly conveyed to the UEs. In another design, the allocation may be implicitly performed via appropriate scheduling policies. For example, the eNB may schedule downlink transmissions (e.g., for data, control information, etc.) on one or more carriers and may schedule uplink transmissions (e.g., for data, control information, etc.) on one or more other carriers. The eNB may broadcast system information to convey the location (e.g., the carrier) where control information is transmitted. The eNB may also transmit (i) downlink grants to convey the location where downlink data is transmitted and (ii) uplink grants to convey the location where uplink data can be transmitted. The UEs may operate in accordance with the system information, the downlink grants, and the uplink grants from the eNB. The UEs may not need to be aware of the allocation of carriers for the downlink and uplink by the eNB.

The available carriers for the wireless network may be part of a spectrum band and may be relatively close (e.g., adjacent) to each other. In this case, the eNBs and/or UEs operating on this spectrum band may not be able to simultaneously transmit and receive on this band, even on different carriers. This may be due to inadequate filtering of interference from nearby carriers.

In one design, carriers may be allocated to the downlink and uplink only when needed to mitigate eNB-to-eNB interference and/or UE-to-UE interference. This design may reduce inefficiency by allocating a given carrier for the downlink or the uplink only when needed, e.g., only when strong interference is detected.

In one design, an eNB may detect for strong interference from other eNBs. This may be achieved by measuring the received power of synchronization signals, reference signals, and/or other signals transmitted by the other eNBs. If strong interference is detected, then the eNB may communicate with the other eNBs or with a designed network entity (e.g., network controller 130 in FIG. 1) via the backhaul to allocate carriers and mitigate eNB-to-eNB interference.

In another design, a UE may detect for strong interference from other UEs. This may be achieved by measuring the received power of reference signals and/or other signals transmitted by the other UEs. Alternatively or additionally, the UE may detect for strong interference from other eNBs, e.g., asynchronous eNBs. In either case, if strong interference is detected, then the UE may report this condition to its serving eNB. The serving eNB may then communicate with nearby eNBs or a designed network entity to allocate carriers and mitigate UE-to-UE interference.

In one design, a UE may detect for strong interference from other UEs on a particular carrier X. If strong interference is detected, then the UE may request the interfering UE(s) to transmit on another carrier Y. Alternatively, the UE may inform an eNB of this condition and may request the eNB to initiate interference avoidance algorithms with its neighbor eNBs. The UE may then receive downlink transmissions on carrier X, without observing interference from the interfering UE(s). The interfering UE(s) may avoid sending uplink transmission on carrier X but can receive downlink transmissions on both carriers X and Y.

Communication on downlink and uplink carriers may be supported in various manners. In one design, a TDD system may be extended to support multi-carrier operation. In one design, cross-carrier operation may be supported to allow control information to be sent on one carrier to support data transmission on another carrier. In particular, downlink control information (DCI) such as grants, acknowledgements (ACK), etc., may be sent on one carrier (a downlink carrier) and may be applicable for uplink data transmission on another carrier (an uplink carrier). Correspondingly, uplink control information (UCI) such as channel quality indicator (CQI), precoding matrix indicator (PMI), rank indicator (RI), ACK, scheduling request (SR), etc., may be sent on one carrier (an uplink carrier) and may be applicable for downlink data transmission on another carrier (a downlink carrier). Other features may also be supported to enable communication on the downlink and uplink carriers.

In another design, an FDD half-duplex system may be modified to support multi-carrier TDD operation. The FDD half-duplex system may assume that UEs are not capable of transmitting and receiving at the same time. To support TDD, the FDD half-duplex system may further assume that eNBs are also not capable of transmitting and receiving at the same time. The FDD half-duplex system may normally require the eNBs to transmit control information and/or reference signals in each subframe. To support TDD operation, the FDD half-duplex system may be modified to allow the eNBs to transmit blank subframes in uplink subframes in which the eNBs are receiving. A blank subframe may be a subframe in which an eNB is not expected to transmit any data, or control information, or reference signals. An eNB may declare all uplink subframes as blank subframes and may broadcast system information conveying these blank subframes. The UEs may skip receiving the blank subframes from the eNB.

The techniques described herein may support asynchronous TDD operation in a wireless network without time synchronization. The techniques may mitigate eNB-to-eNB interference and/or UE-to-UE interference, both inter-frequency and intra-frequency. The techniques may be employed when and as needed in order to improve performance while minimizing inefficiency.

Figure 7:
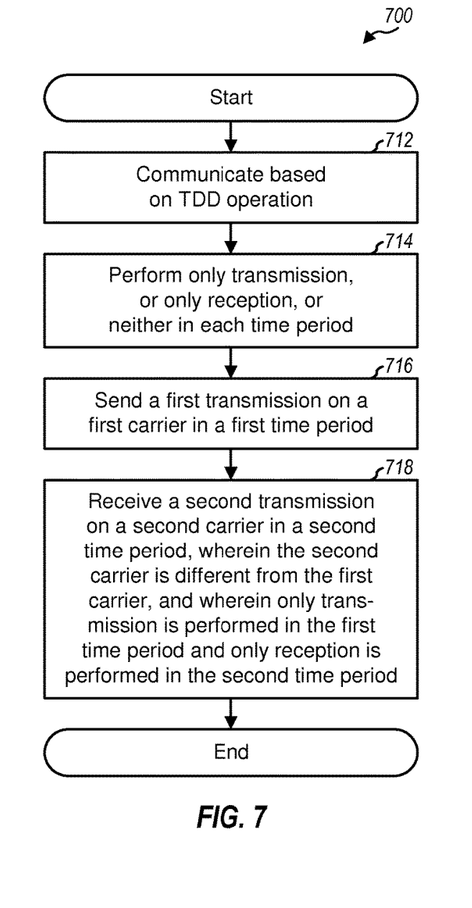
FIG. 7 shows a process for communicating in a TDD wireless network.

FIG. 7 shows a design of a process 700 for wireless communication. Process 700 may be performed by a station, which may be a UE, or a base station/eNB, or a relay, or some other entity. The station may communicate based on TDD operation (block 712) and may perform only transmission, or only reception, or neither in each time period (block 714). Each time period may correspond to a subframe or some other unit of time. The station may send a first transmission on a first carrier in a first time period (block 716) and may receive a second transmission on a second carrier in a second time period (block 718). The second carrier may be different from the first carrier. The station may perform only transmission in the first time period and may perform only reception in the second time period.

In one design, the first carrier may be used for one link (e.g., the downlink or uplink), and the second carrier may be used for the other link (e.g., the uplink or downlink). In one design, the station may send a third transmission on a third carrier in a third time period and may receive a fourth transmission on the third carrier in a fourth time period. The third carrier may be different from the first and second carriers and may be used for both the downlink and uplink. In general, any number of carriers may be available, and each carrier may be used for the downlink, or the uplink, or both.

In one design, process 700 may be performed by a base station, the first carrier may be used for the downlink, and the second carrier may be used for the uplink. The base station may send a downlink transmission on the first carrier in the first time period in block 716 and may receive an uplink transmission on the second carrier in the second time period in block 718.

In another design, process 700 may be performed by a UE, the first carrier may be used for the uplink, and the second carrier may be used for the downlink. The UE may send an uplink transmission on the first carrier in the first time period in block 716 and may receive a downlink transmission on the second carrier in the second time period in block 718.

In one design, carrier allocation may be performed due to asynchronous operation and/or different downlink-uplink partitionings among base stations. The station may be a base station operating asynchronously with at least one other base station. Alternatively or additionally, the base station may have a first downlink-uplink partitioning and may be within range of a second base station having a second downlink-uplink partitioning that is different from the first downlink-uplink partitioning.

In one design, carrier allocation may be performed when strong interference is detected. In one design, the station may be a base station that may determine strong interference from another base station or from the UEs served by the other base station. For example, the base station may (i) measure the uplink and detect strong interference from the UEs served by the other base station and/or (ii) determine strong interference from the other base station based on at least one measurement report from at least one UE. The first carrier may be used for only the downlink and the second carrier may be used for only the uplink in response to the base station determining strong interference. In another design, the station may be a UE that may detect strong interference from another UE. The first carrier may be used for the uplink and the second carrier may be used for the downlink in response to the UE detecting strong interference. For both designs, when strong interference is not detected, the first and second carriers may be used for both the downlink and uplink. Carrier allocation may also be enabled in other manners.

In one design, carrier allocation may be explicitly performed, and the downlink carrier(s) and/or uplink carrier(s) may be signaled to the UEs. In another design, carrier allocation may be implicitly performed. For example, a first UE may be scheduled for data transmission on the downlink on the first carrier, and a second UE may be scheduled for data transmission on the uplink on the second carrier.

In general, the first and second transmissions may each comprise data, or control information, or a reference signal, or some other information, or a combination thereof. In one design, the first transmission may comprise control information, and the second transmission may comprise data, or vice versa.

In one design, cross-subframe control may be supported. The station may send the first transmission comprising control information on the first carrier in the first time period. The station may receive the second transmission comprising data on the second carrier in the second time period. The control information on the first carrier may be applicable for the second transmission of data sent on the second carrier. In one design, blank subframes may be supported. The second time period may be declared as a blank subframe with no transmission.

In one design, a plurality of carriers may be available, and the first and second carriers may be two of the plurality of carriers. Each carrier may correspond to a different frequency range within a spectrum band. In one design, the second carrier may be furthest away in frequency from the first carrier among the plurality of carriers.

Figure 8:
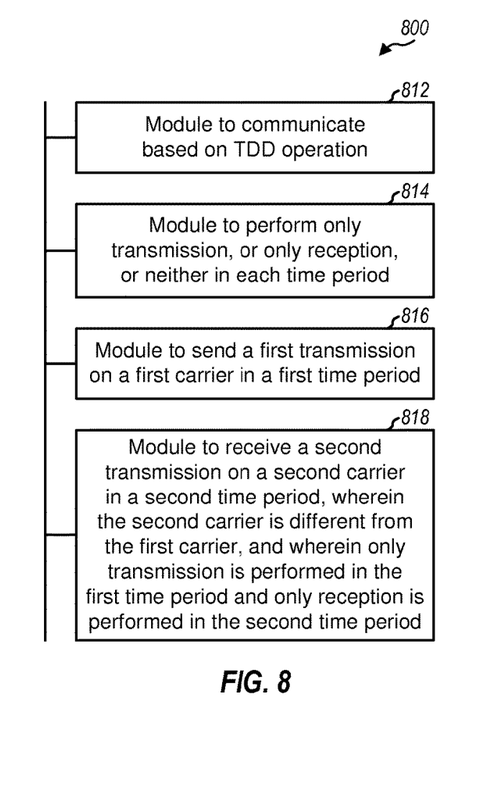
FIG. 8 shows an apparatus for communicating in a TDD wireless network.

FIG. 8 shows a design of an apparatus 800 for wireless communication. Apparatus 800 includes a module 812 to communicate based on TDD operation, a module 814 to perform only transmission, or only reception, or neither in each time period, a module 816 to send a first transmission on a first carrier in a first time period, and a module 818 to receive a second transmission on a second carrier in a second time period. The second carrier may be different from the first carrier. Only transmission may be performed in the first time period, and only reception may be performed in the second time period.

The modules in FIG. 8 may comprise processors, electronic devices, hardware devices, electronic components, logical circuits, memories, software codes, firmware codes, etc., or any combination thereof.

Figure 9:
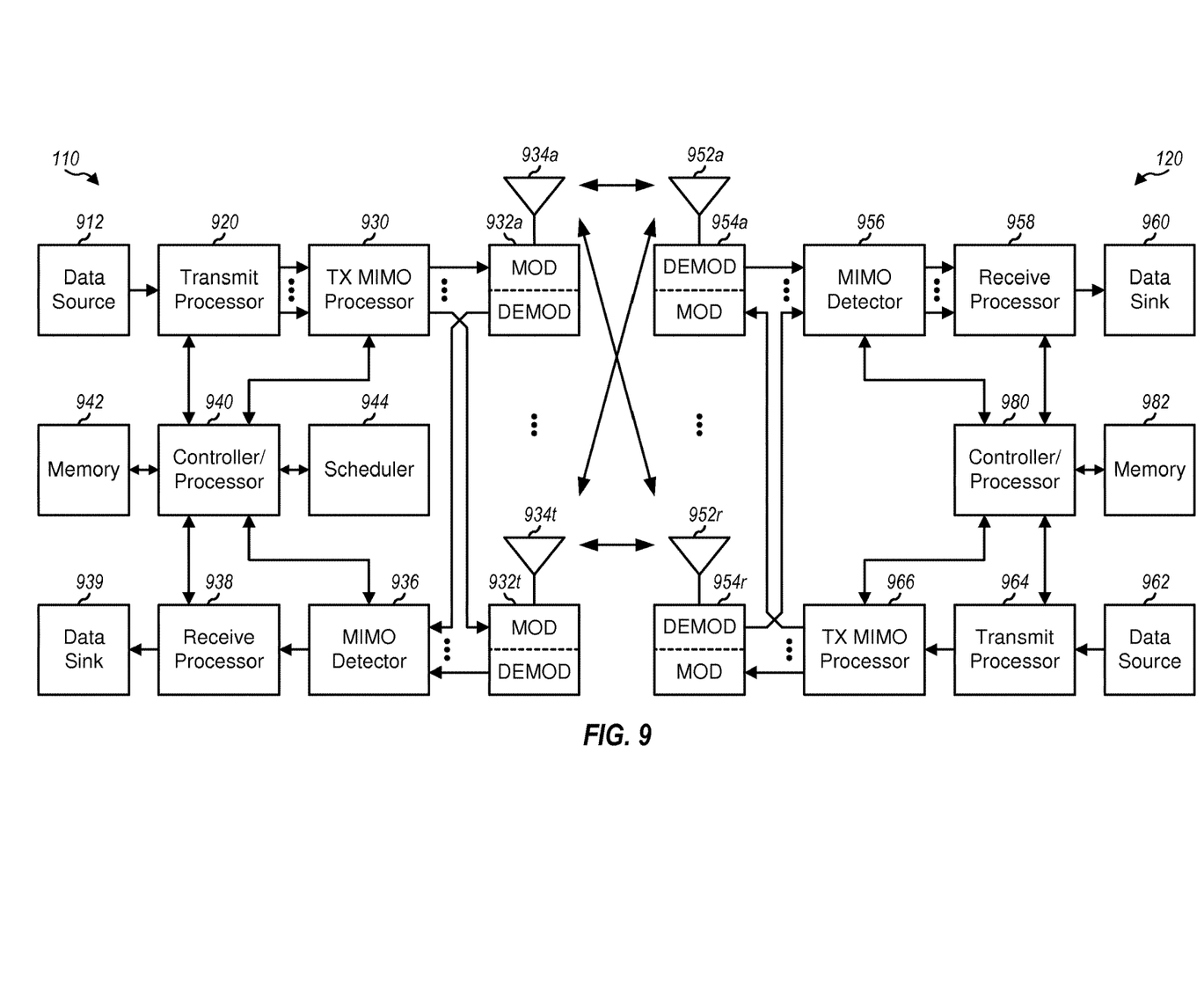
FIG. 9 shows a block diagram of a base station and a UE.

FIG. 9 shows a block diagram of a design of a base station/eNB 110 and a UE 120, which may be one of the base stations/eNBs and one of the UEs in FIGS. 1 and 3. Base station 110 may be equipped with T antennas 934*a* through 934*t*, and UE 120 may be equipped with R antennas 952*a* through 952*r*, where in general $T \geq 1$ and $R \geq 1$.

At base station 110, a transmit processor 920 may receive data from a data source 912 and control information from a controller/processor 940. The control information may comprise system information, downlink grants, uplink grants, ACK, etc. Processor 920 may process (e.g., encode and modulate) the data and control information to obtain data symbols and control symbols, respectively. Processor 920 may also generate reference symbols for one or more reference signals. A transmit (TX) multiple-input multiple-output (MIMO) processor 930 may perform spatial processing (e.g., precoding) on the data symbols, the control symbols, and/or the reference symbols, if applicable, and may provide T output symbol streams to T modulators (MODs) 932*a* through 932*t*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932*a* through 932*t* may be transmitted via T antennas 934*a* through 934*t*, respectively.

At UE 120, antennas 952*a* through 952*r* may receive the downlink signals from base station 110 and other base stations and may provide received signals to demodulators (DEMODs) 954*a* through 954*r*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all R demodulators 954*a* through 954*r*, perform MIMO detection on the received symbols if applicable, and provide detected symbols. A receive processor 958 may process (e.g., demodulate and decode) the detected symbols, provide decoded data for UE 120 to a data sink 960, and provide decoded control information to a controller/processor 980.

On the uplink, at UE 120, a transmit processor 964 may receive data from a data source 962 and control information from controller/processor 980. Processor 964 may process (e.g., encode and modulate) the data and control information to obtain data symbols and control symbols, respectively. Processor 964 may also generate reference symbols for one or more reference signals. The symbols from transmit processor 964 may be precoded by a TX MIMO processor 966 if applicable, further processed by modulators 954*a* through 954*r* (e.g., for SC-FDM, OFDM, etc.), and transmitted to base station 110 and possibly other base stations. At base station 110, the uplink signals from UE 120 and other UEs may be received by antennas 934, processed by demodulators 932, detected by a MIMO detector 936 if applicable, and further processed by a receive processor 938 to obtain decoded data and control information sent by UE 120 and other UEs. Processor 938 may provide the decoded data to a data sink 939 and the decoded control information to controller/processor 940.

Controllers/processors 940 and 980 may direct the operation at base station 110 and UE 120, respectively. Processor 940 and/or other processors and modules at base station 110 may perform or direct process 700 in FIG. 7 and/or other processes for the techniques described herein. Processor 980 and/or other processors and modules at UE 120 may also perform or direct process 700 in FIG. 7 and/or other processes for the techniques described herein. Memories 942 and 982 may store data and program codes for base station 110 and UE 120, respectively. A scheduler 944 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method performed by a base station for wireless communication, comprising:
    determining an interference condition for a first wireless carrier, the determining an interference condition based at least in part on receiving an interference report from a user equipment (UE) or detecting interference from another base station;
    communicating with one of a network entity or another base station to initiate interference mitigation techniques associated with the first wireless carrier and a second wireless carrier that has a transmission timing different from a transmission timing of the first wireless carrier;
    reallocating the first wireless carrier from a two-way carrier for both uplink and downlink transmissions to a one-way carrier in response to the determining the interference condition; and
    communicating over the one-way carrier according to time division duplexing (TDD) operations.

2. The method of claim 1, wherein reallocating the first wireless carrier comprises reallocating the first wireless carrier from a two-way carrier to a one-way uplink carrier, the method further comprising:
transmitting an uplink grant to a first UE to convey resources of the first wireless carrier for uplink data transmission.

3. The method of claim 2, further comprising transmitting downlink communications over the second wireless carrier in a time period different from when communicating over the one-way carrier, in response to the determining the interference condition.

4. The method of claim 3, further comprising:
reallocating the second wireless carrier from a two-way carrier to a one-way downlink carrier in response to the determining the interference condition.

5. The method of claim 1, wherein the one-way carrier is a downlink carrier.

6. The method of claim 5, further comprising receiving communications over an uplink carrier in a time period different from when communicating over the one-way carrier, in response to the determining the interference condition.

7. An apparatus in a base station for wireless communication, comprising:
a memory; and
at least one processor coupled to the memory and configured:
to determine an interference condition for a first wireless carrier, the determining an interference condition based at least in part on receiving an interference report from a user equipment (UE) or detecting interference from another base station;
to communicate with one of a network entity or another base station to initiate interference mitigation techniques associated with the first wireless carrier and a second wireless carrier that has a transmission timing different from a transmission timing of the first wireless carrier;
to reallocate the first wireless carrier from a two-way carrier for both uplink and downlink transmissions to a one-way carrier in response to a determination of an interference condition; and
to communicate over the one-way carrier according to time division duplexing (TDD) operations.

8. The apparatus of claim 7, wherein the at least one processor is further configured:
to reallocate the first wireless carrier from a two-way carrier to a one-way uplink carrier; and
to transmit an uplink grant to a first UE to convey resources of the first wireless carrier for uplink data transmission.

9. The apparatus of claim 8, wherein the at least one processor is further configured to transmit downlink communications over the second wireless carrier in a time period different from when communicating over the one-way carrier, in response to a determination of an interference condition.

10. The apparatus of claim 9, wherein the at least one processor is further configured to reallocate the second wireless carrier from a two-way carrier to a one-way downlink carrier in response to a determination of an interference condition.

11. The apparatus of claim 7, wherein the one-way carrier is a downlink carrier.

12. The apparatus of claim 11, wherein the at least one processor is further configured to receive communications over an uplink carrier in a time period different from when communicating over the one-way carrier, in response to a determination of an interference condition.

13. An apparatus in a base station for wireless communication, comprising:
means for determining an interference condition for a first wireless carrier, the determining an interference condition based at least in part on receiving an interference report from a user equipment (UE) or detecting interference from another base station;
means for communicating with one of a network entity or another base station to initiate interference mitigation techniques associated with the first wireless carrier and a second wireless carrier that has a transmission timing different from a transmission timing of the first wireless carrier;
means for reallocating the first wireless carrier from a two-way carrier for both uplink and downlink transmissions to a one-way carrier in response to a determination of an interference condition; and
means for communicating over the one-way carrier according to time division duplexing (TDD) operations.

14. The apparatus of claim 13, wherein means for reallocating the first wireless carrier comprise means for reallocating the first wireless carrier from a two-way carrier to a one-way uplink carrier, the apparatus further comprising:
means for transmitting an uplink grant to a first UE to convey resources of the first wireless carrier for uplink data transmission.

15. The apparatus of claim 14, further comprising means for transmitting downlink communications over the second wireless carrier in a time period different from when communicating over the one-way carrier, in response to a determination of an interference condition.

16. The apparatus of claim 15, further comprising means for reallocating the second wireless carrier from a two-way carrier to a one-way downlink carrier in response to a determination of an interference condition.

17. The apparatus of claim 13, wherein the one-way carrier is a downlink carrier.

18. The apparatus of claim 17, further comprising means for receiving communications over an uplink carrier in a time period different from when communicating over the one-way carrier, in response to a determination of an interference condition.

19. A non-transitory computer-readable medium comprising code that is executable by at least one processor, the non-transitory computer-readable medium comprising:
code for determining an interference condition for a first wireless carrier, the determining an interference condition based at least in part on receiving an interference report from a user equipment (UE) or detecting interference from another base station;
code for communicating with one of a network entity or another base station to initiate interference mitigation techniques associated with the first wireless carrier and a second wireless carrier that has a transmission timing different from a transmission timing of the first wireless carrier;
code for causing a base station to reallocate the first wireless carrier from a two-way carrier for both uplink and downlink transmissions to a one-way carrier in response to a determination of an interference condition; and
code for causing the base station to communicate over the one-way carrier according to time division duplexing (TDD) operations.

20. The non-transitory computer-readable medium of claim 19, wherein reallocating the first wireless carrier comprises reallocating the first wireless carrier from a two-way carrier to a one-way uplink carrier, the method further comprising:

transmitting an uplink grant to a first UE to convey resources of the first wireless for uplink data transmission.

21. The non-transitory computer-readable medium of claim 20, further comprising code for causing the base station to transmit downlink communications over the second wireless carrier in a time period different from when communicating over the one-way carrier, in response to a determination of an interference condition.

22. The non-transitory computer-readable medium of claim 21, further comprising code for causing the base station to reallocate the second wireless carrier from a two-way carrier to a one-way downlink carrier in response to a determination of an interference condition.

23. The non-transitory computer-readable medium of claim 19, wherein the one-way carrier is a downlink carrier.

24. The non-transitory computer-readable medium of claim 23, further comprising code for causing the base station to receive communications over an uplink carrier in a time period different from when communicating over the one-way carrier, in response to a determination of an interference condition.

\* \* \* \* \*